United States Patent
Gaylord

[15] 3,670,631
[45] June 20, 1972

[54] ROTATING VIBRATOR
[72] Inventor: Richard P. Gaylord, St. Joseph, Mich.
[73] Assignee: Clark Equipment Company
[22] Filed: Dec. 28, 1970
[21] Appl. No.: 101,892

[52] U.S. Cl. ................................................94/50 V, 74/61
[51] Int. Cl. ...........................................E01c 19/28
[58] Field of Search.....................94/50, 50 V; 74/61, 87

[56] References Cited

UNITED STATES PATENTS

| | | | |
|---|---|---|---|
| 3,498,601 | 3/1970 | Koval | 74/61 X |
| 3,262,329 | 7/1966 | Herrmann | 94/48 X |
| 3,505,885 | 4/1970 | Waschulewski | 94/48 X |
| 3,192,839 | 7/1965 | Vivier | 94/50 V |
| 3,385,119 | 5/1968 | Berger | 94/48 X |
| 3,543,656 | 12/1970 | Roettger | 94/50 V |

Primary Examiner—Jacob L. Nackenoff
Attorney—Kenneth C. Witt, John C. Wiessler, Robert H. Johnson and Lewis J. Lamm

[57] ABSTRACT

A vibrator has two rotating eccentric masses which are interlocked to operate at the same speed. The eccentric masses are arranged so that one is movable circumferentially during rotation relative to the other to change between a vibrating condition and a non-vibrating condition. Two individual motors may be utilized to drive the eccentric masses, and means are provided for changing the relative torque outputs of the motors to shift one eccentric mass relative to the other to change between the vibrating condition and the non-vibrating condition.

7 Claims, 7 Drawing Figures

PATENTED JUN 20 1972

INVENTOR
RICHARD P. GAYLORD

BY
Kenneth C. Witt
ATTORNEY

INVENTOR
RICHARD P. GAYLORD

BY
Kenneth C. Witt
ATTORNEY 3,670,631

ROTATING VIBRATOR

BACKGROUND OF THE INVENTION

This invention relates to rotating vibrators which can be changed during rotation between one condition in which vibration occurs and another condition in which the vibration does not occur, or at least is of a lower magnitude. The rotating vibrator disclosed herein is particularly useful in vibratory vehicles which are used to compact bituminous paving materials, crushed rock, earth and other materials, but it will be recognized that it is not limited to such use.

Various types of vibrators are known and used in vehicles which are employed in compacting bituminous paving materials, crushed rock, earth and other materials, and one is the rotating type. One difficulty with the use of rotating vibrators in such compactor vehicles heretofore has been that when it is necessary to stop the compactor vehicle on bituminous paving material, for example, that it is necessary to stop or at least slow down the rotating vibrator to prevent the roller of the vibrator vehicle from producing an unwanted depression at the place where the roller stops. It will be appreciated this is a considerable problem when a vibratory roller vehicle is being utilized for compacting material such as paving material, because the rolling normally is done in a continuing back and forth operation.

Accentuating the problem is the fact that in many rotating vibrators, when the eccentric mass is slowed down, the entire rotating system goes through a critical speed at which a resonant condition of the various elements of the system produces a vibration that actually becomes greater for a brief period. Some times it is so great that it is deleterious to the compact or vehicle as well as unpleasant to the operator.

The present invention provides a construction which makes it readily possible to stop the vibrating action of the rotating vibrator at any time that the operator desires to do this, and then to resume vibrating action quickly at the wish of the operator.

SUMMARY OF THE INVENTION

In carrying out my invention in one form, I provide a vibrator having two rotating eccentric masses which are interlocked to operate at the same speed. One of the eccentric masses is arranged so that it is movable circumferentially during rotation approximately 180° relative to the other to change from a condition in which the offset masses of the eccentrics are additive and vibration is produced to a condition in which the offset masses counteract each other and vibration is stopped. Means are provided for driving the eccentrics individually and for changing the relative torque outputs of the individual driving means to move one eccentric between two positions to shift between the vibrating condition and the non-vibrating condition.

DESCRIPTION OF PREFERRED EMBODIMENT

Figure 1:
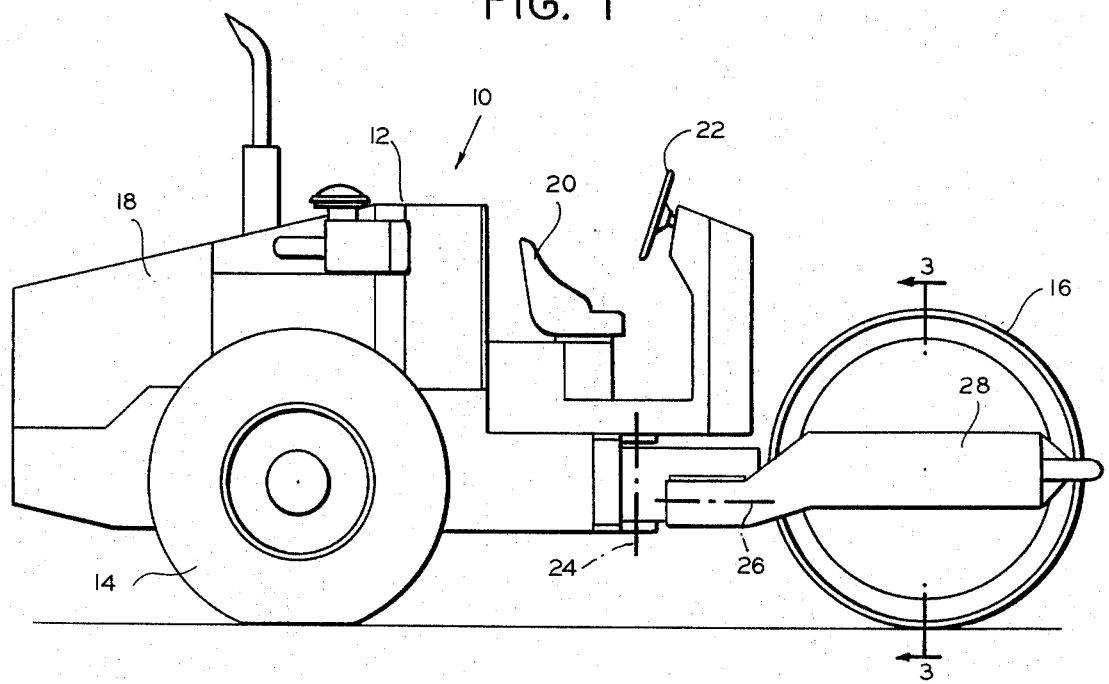
FIG. 1 shows a side elevational view of a vibratory roller vehicle embodying the present invention.

Referring to FIG. 1 of the drawing, there is shown a compactor vehicle 10 which embodies the present invention. The vehicle 10, in addition to the main body portion 12, includes a pair of rubber tired rear wheels 14 (only one of which is visible in the drawing) and a single cylindrical metal roller 16 at the front of the vehicle. In the vehicle illustrated, only the wheels 14 are driven and this is accomplished in the usual manner by means of an engine within enclosure 18 which, through a suitable transmission and axle, drives the rear wheels 14. The front drum or roller 16 rolls freely as the vehicle moves forwardly or rearwardly; however, roller 16 contains a vibrator therein which is illustrated in the drawing and described in detail hereinafter. The vehicle 10 includes the usual operator's station including a seat 20, an operator's steering wheel 22, and the other devices necessary for the operation of vehicle 10.

The vehicle illustrated is of the articulated type. For steering, it is arranged so that the front roller of the vehicle and the rear portion of the vehicle supported by the two rubber tired wheels may be pivoted with respect to each other about a vertically disposed axis 24 in a known manner. The vehicle illustrated also is arranged so that the roller 16 is arranged to pivot from side to side about a longitudinally disposed axis 26, to accommodate unevenness in the ground or pavement over which the compactor vehicle 10 is operating.

Figure 2:
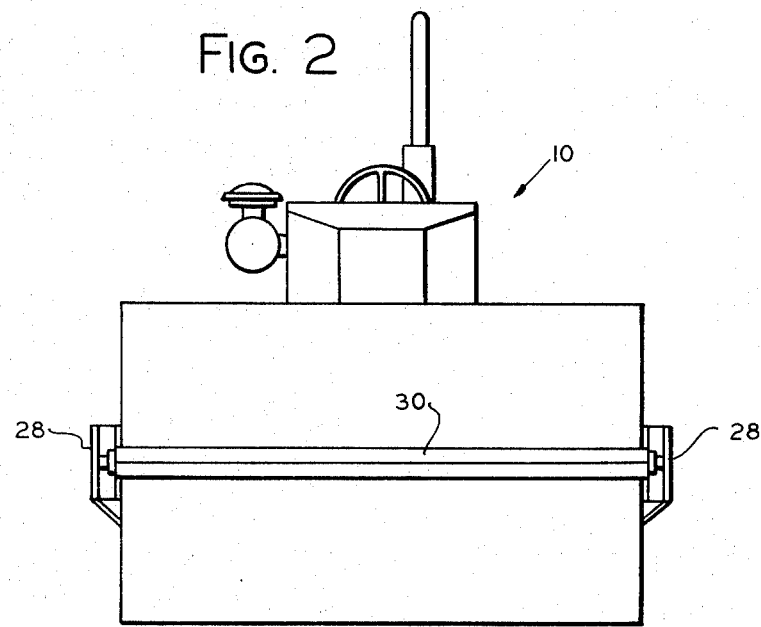
FIG. 2 shows a front end view of the same vehicle.

The roller 16 is supported on a pair of structural members 28, one on each side of the roller, as best seen in FIG. 2, and at the front of the roller, a cleaner member 30 may be provided.

Figure 3:
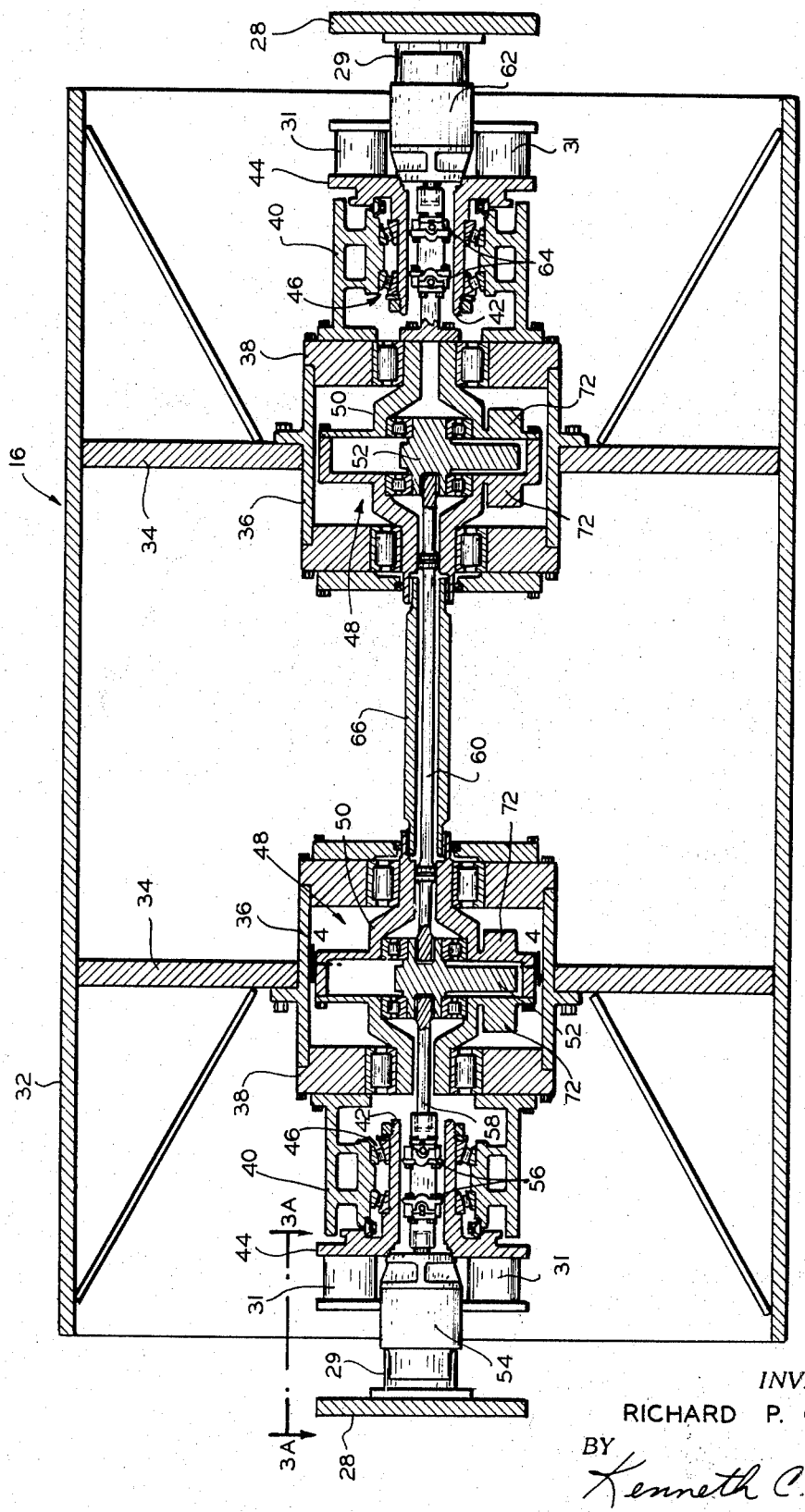
FIG. 3 shows a sectional view along the line 3—3 of FIG. 1.
Figure 3A:
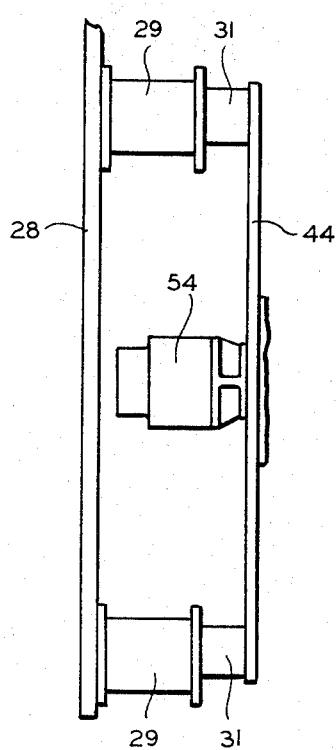
FIG. 3A shows a fragmentary sectional view along the line 3A—3A of FIG. 3.

As mentioned previously, roller 16 rolls freely as the vehicle is propelled by the driving wheels 14, and the structure by which this is accomplished is illustrated in the sectional view of FIG. 3. As shown in FIG. 3, the roller 16 comprises an outer cylindrical member 32. Extending inwardly from member 32 are structural members 34 adjacent both ends of 32 which are connected respectively to cylindrical members 36, which in turn are connected by means of intermediate members 38 to outwardly projecting bearing support members 40. Extending inwardly within the rotatable members 40 are integral cylindrical portions 42 of structural members 44 which are, in turn, secured to the structural members 28 extending along both sides of the roller 16 by intervening spacers 29 and rubber vibration isolators 31. See FIG. 3A in addition to FIG. 3 for the details of this structure. As shown, rotatable portions 40 are carried on fixed portions 42 by means of tapered roller bearings 46.

As illustrated and described herein, roller 16 houses a double vibrator, but it will be readily appreciated by those skilled in the art that the present invention is equally applicable to a single vibrator or it can include more than two vibrators. Inasmuch as the two vibrators shown are the same except that one is allochirally related to the other, the same identifying numerals and description are given for both.

Each of the two vibrators is indicated generally by the numeral 48 and each comprises an outer eccentric portion or member 50 and an inner eccentric member 52, although it will be understood that the present invention is not limited to having one of the vibrator members housed within the other.

It should also be understood that where reference is made hereinafter in the claims and elsewhere to the term "eccentric" that the intention is to refer to a member or structure which has a center of mass which is not located at the center of rotation of the member or structure. The shape of the member will ordinarily be nonsymmetrical with respect to the axis of rotation, but regardless of the shape, the essential feature in this invention when reference is made to an eccentric is that the center of mass does not coincide with the center of rotation.

In the preferred mode of carrying out the invention described and illustrated herein, the inner eccentrics 52 are driven by means of a hydraulic motor 54 which appears at the left of FIG. 3. Motor 54 drives both of the inner eccentrics 52 through universal joints 56, a shaft 58 connecting with the eccentric 52 on the left and another shaft 60 connecting the two inner eccentrics together for conjoint rotation.

The outer eccentrics 50 in this compactor vehicle are driven by another hydraulic motor 62 which appears at the right in FIG. 3 through universal joints 64 which connect to the outer eccentric 50 on the right, and a hollow shaft 66 which connects the two outer eccentric members 50 together for conjoint rotation. The necessary bearings, seals, connections and other parts are provided for the motors and the eccentrics and other parts driven by the motors.

Figure 4:
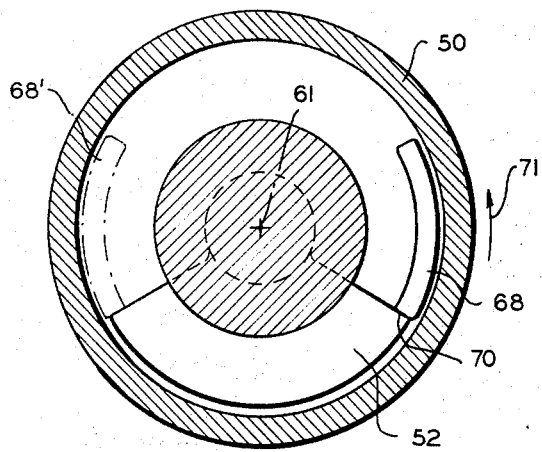
FIG. 4 shows a fragmentary sectional view along line 4—4 of FIG. 3 (inside left cylinder member 36)

FIG. 4 of the drawing shows the configurations of the eccentric 52. Its center of mass is considerably below the axis of rotation 61 (the axis of shaft 60) with the result that vibration is produced when eccentric 52 is rotated. Also appearing in FIG. 4 is a projection 68 from the inside surface of the outer eccentric 50, by which the two eccentrics are interlocked, and in the position shown, projection 68 abuts eccentric member 52 at 70. When the two eccentric members are in this position, their centers of mass are both on the same side of the axis of rotation. It is pointed out that outer eccentric member 50 has projections 72 at the bottom (see FIG. 3) which increase the weight of the bottom portion of this member in the position indicated in FIG. 3 of the drawing. Thus, if the two eccentrics are rotated by their respective hydraulic motors and they remain in the relative circumferential relation shown in FIG. 4, vibration will be produced which reacts upon the drum member 16. It will be appreciated that the vibrator on the right side of FIG. 3 operates in the same manner as the vibrator on the left side.

If it is desired quickly to stop the vibration it is necessary only to accomplish the movement of the outer eccentric members 50 circumferentially 180° with respect to the inner eccentric members 52 to the position illustrated by the dot-dash lines in FIG. 4 and indicated by the identifying character 68'. This can be done very readily and quickly with the present invention, and the manner in which it is accomplished will be understood by reference to FIG. 6 of the drawing.

Figure 6:
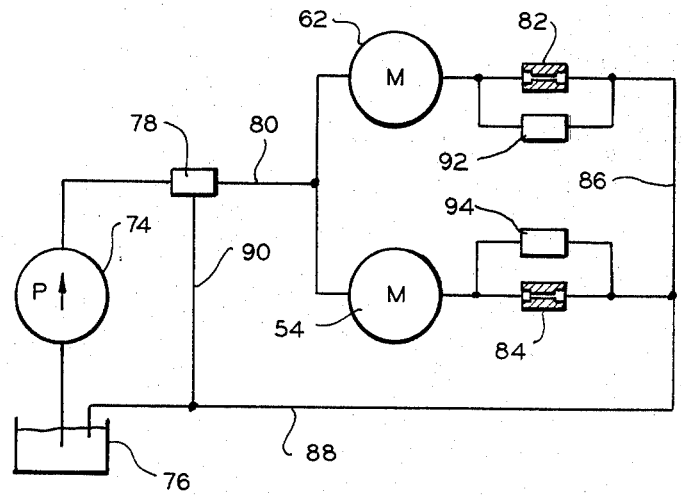
FIG. 6 shows a schematic diagram of the hydraulic circuit which may be used to operate the two hydraulic motors forming a part of the disclosed vibrator.

FIG. 6 shows the hydraulic circuit for operating the hydraulic motors 54 and 62 to rotate the eccentrics 52 and 50 respectively. The hydraulic system comprises a pump 74 which draws fluid from a reservoir 76 and discharges it under pressure through a valve 78, through a conduit 80, and thence through motors 62 and 54. The flow of pressurized fluid from conduit 80 is divided approximately equally by a pair of orifices 82 and 84 which are in circuit with the respective motors on the discharge side. It will be appreciated that if these orifices were precisely equal, and both motors and their loads were identical, that both motors would operate at exactly the same speed. As a practical matter, however, only an approximation of equal flow is required and a slight inequality in the flow between the two orifices is not critical. The flow through motor 62 drives the outer eccentrics, while the flow through motor 54 drives the inner eccentrics 52. From the respective hydraulic orifices 82 and 84 the fluid is returned through conduits 86 and 88 back to the reservoir. Valve 78 preferably is of the open-center type and when operation of neither of the motors is required, it bypasses fluid by means of conduit 90 directly to 88 and thence back to the reservoir.

During operation, when vibration is desired, assuming that pump 74 is in operation and that valve 78 is open, a valve 94 is opened which is in parallel with orifice 84. Valve 94 then passes a small additional amount of fluid to make certain that motor 54 exerts more torque than motor 62 and that inner eccentric 52 abuts projection 68 on the outer eccentric as shown in FIG. 4. Arrow 71 in FIG. 4 shows the direction of rotation. This causes the two eccentrics of each pair to assume the additive or vibrating position illustrated in FIGS. 3 and 4. When it is desired to neutralize the vibration, valve 94 is closed and valve 92 is opened to provide additional flow to motor 62. This causes the outer eccentrics 50 to overtake the inner eccentrics 52 and the projection 68' on the outer eccentrics to move 180° so that the eccentrics 50 in each case push on eccentrics 52 instead of vice versa, and in this position, the effects of the off-center masses of the inner and outer eccentrics cancel each other and there is no vibration. The letter condition is illustrated by the dot-dash lines of projection 68' in FIG. 4.

It will be understood by those skilled in the art that the location of orifices 82 and 84 and valves 92 and 94 on the discharge side of the motor prevents the possibility of cavitation in the motors and assures a more positive control than if the orifices and valves were located on the inlet side.

It will be appreciated that the operation described in the preceding paragraph is dependent upon pressure as to which motor is dominant. That is, if valve 94 is open and 92 is closed, there is a lightly less pressure drop through the combination of valve 94 and orifice 84 than through orifice 82 which produces slightly greater pressure drop across motor 54 than across motor 62 and thus causes motor 54 to exert a slightly greater torque than motor 62. The reverse is true, of course, when valve 92 is open and valve 94 is closed.

Figure 5:
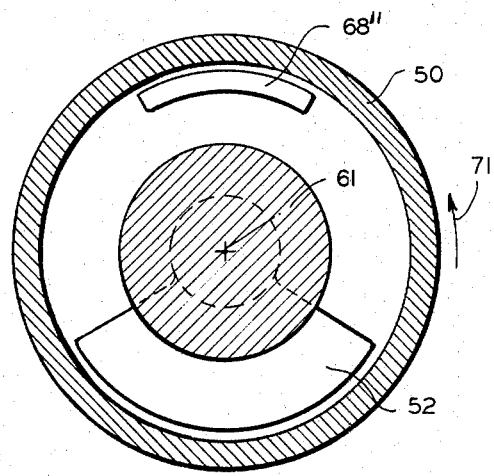
FIG. 5 shows another fragmentary sectional view along line 4—4 of FIG. 3.

It will be appreciated also that it is possible to utilize flow instead of pressure to control the motors 54 and 62 and this makes it possible to control the relative circumferential position of the two eccentrics so that they may be positioned at any of an infinite number of positions between the two extreme positions illustrated in FIG. 4. For example, FIG. 5 shows the outer eccentric 50 rotated so that it is approximately half way between the extreme positions of FIG. 4, and in this position, the stop portion is indicated by the character 68''. By adjustment of the flow through valve 94 or valve 92 or both, it is possible to achieve any desired intermediate position; and, of course, the amount of vibration, assuming the speed of rotation remains the same, is reduced as the outer eccentric 50 moves circumferentially relative to eccentric 52 from the solid line position of stop member 68 as shown in FIG. 4 to the dot-dash line position 68' of such stop member. Thus, the present invention can be utilized not only to start and stop vibration, but also to adjust it as desired between maximum vibration and no vibration.

Referring again to the on-off operation first described, it will be readily appreciated that if desired, valves 92 and 94 can be connected to the shifting mechanism of the vehicle so that whenever the transmission of the vehicle is shifted to neutral, valve 94 is closed and valve 92 opened to cause vibration to stop. Under other conditions, when the vehicle is moving forwardly or rearwardly, valve 92 is closed and valve 94 is open, and under such conditions the vibrators are both in full operation.

It will be appreciated also that is may not be necessary to use both valves 92 and 94. The orifices 82 and 84 can be unbalanced slightly so that one motor normally will dominate over the other. For example, orifice 82 could be made larger so that motor 62 will normally dominate and this makes unnecessary valve 92. Under these circumstances, only valve 94 is used, and it is made large enough that in combination with the flow through orifice 84, it causes motor 54 to dominate over motor 62.

While I have described and illustrated herein a preferred form of my vibrator and a vehicle in which it can be used, it will be understood that modifications may be made in both the vibrator and the vehicle. For example, electric motors or pneumatic motors can be used instead of hydraulic motors or mechanical drives from the engine propelling the vehicle providing only that the operating or driving means for the two eccentrics are separately controllable. Accordingly, it should be understood that I intend to cover by the appended claims all such modifications falling within the true spirit and scope of my invention.

I claim:

1. A vibrator having two rotatable eccentrics which are interlocked to operate at the same speed, the eccentrics being arranged so that they are movable circumferentially relative to each other during rotation to change the location of the center of mass and thereby the amount of vibration, separate means driving the said eccentrics respectively, and means for changing during rotation the driving force of one of the said separate driving means relative to the other.

2. A vibrator as specified in claim 1 in which one of the said eccentrics is in the form of a housing which houses the other said eccentric and the said eccentrics rotate in the same direction.

3. A vibrator as specified in claim 2 in which there is an inward projection from the said housing which abuts the inner eccentric and permits approximately 180° relative movement between the two eccentrics.

4. A vibrator as specified in claim 1 in which the said separate driving means are two hydraulic motors, and including means for causing either of the said motors selectively to exert more torque than the other.

5. A vibrator as specified in claim 4 which includes a single source of pressurized fluid for the two hydraulic motors, a flow divider for dividing the flow from such source approximately equally between the motors, and a valve arranged in parallel with one of the flow dividers which when it is opened unbalances the fluid flow through the motors.

6. A vibratory compactor comprising a horizontally disposed cylindrical roller containing two rotatable eccentrics which are interlocked to operate at the same speed, the eccentrics being arranged so that one eccentric is movable during rotation of the eccentrics circumferentially approximately 180° relative to the other to change between a condition in which the offset masses of the eccentrics are additive at least in part and vibration of the roller is produced and a condition in which the offset masses at least partially counteract each other and there is less or no vibration, two motors located respectively adjacent the opposite ends of the roller and connected respectively for driving the said eccentrics, and means for changing the relative driving forces of the said motors to move the said one eccentric to achieve the desired amount of vibration.

7. A vibratory compactor as specified in claim 6 having a second pair of rotating eccentrics, each of the said pairs of eccentrics including an outer eccentric and an inner eccentric, the two outer eccentrics being connected together and driven by one of the said motors, and the two inner eccentrics connected together and driven by the other of the said motors.

* * * * *